No. 727,537. PATENTED MAY 5, 1903.
I. FRANK.
ATTACHMENT FOR HAMES.
APPLICATION FILED AUG. 8, 1902.
NO MODEL
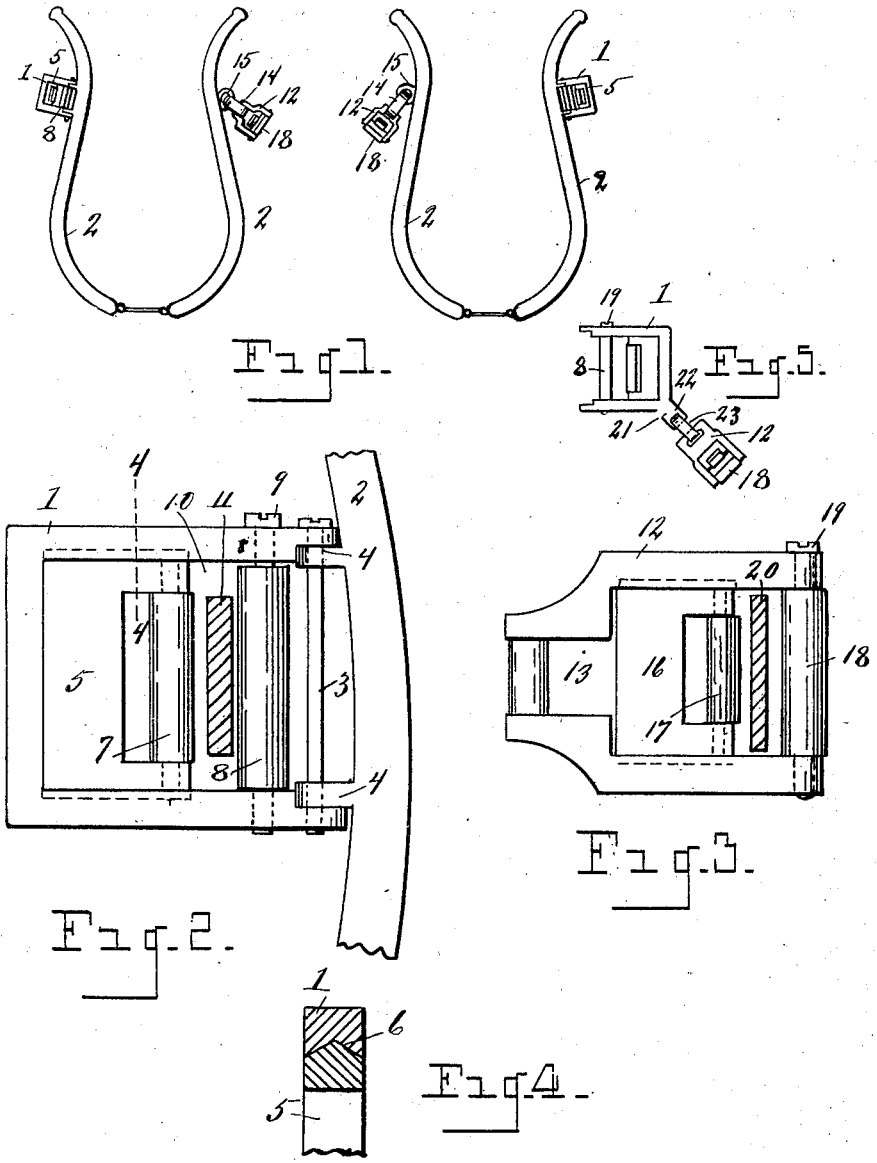
WITNESSES.
INVENTOR.
Isaac Frank
By R. B. Wheeler & Co.
Attorneys No. 727,537. Patented May 5, 1903.

UNITED STATES PATENT OFFICE.

ISAAC FRANK, OF TURTLE CREEK, MINNESOTA.

ATTACHMENT FOR HAMES.

SPECIFICATION forming part of Letters Patent No. 727,537, dated May 5, 1903.

Application filed August 8, 1902. Serial No. 118,839. (No model.)

*To all whom it may concern:*

Be it known that I, ISAAC FRANK, a citizen of the United States, residing at Turtle Creek, in the county of Todd, State of Minnesota, have invented certain new and useful Improvements in Attachments for Hames; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a lines-spreading attachment for hames; and it consists in the construction and arrangement of parts hereinafter fully set forth.

The object of the invention is to provide simple and efficient means for guiding and spreading the lines in substitution for the rings in the hames ordinarily employed for this purpose, the arrangement being such as to allow free play to the lines and prevent them from twisting.

The above object is attained by the structure illustrated in the accompanying drawings, in which—

Figure 1 is an elevation of a pair of hames provided with my improved attachment. Fig. 2 is an enlarged detail of a section of one of the hames, showing my attachment pivoted thereon. Fig. 3 is an elevation of the attachment used upon the inside of a set of hames for a double harness. Fig. 4 is a sectional view as on line 4 4 of Fig. 2. Fig. 5 is an elevation of a modification for employing the attachment in a single or double harness.

Referring to the characters of reference, 1 designates a frame, which is preferably rectangular in shape and which is pivotally secured to the outside of the hame 2 by means of a bolt 3, which passes through the ends of the frame and through the ears 4 of the hame.

Mounted within the frame 1 is a slide 5, which is dovetailed therein, as shown at 6 in Fig. 4, and adapted to reciprocate. Journaled in said slide is a roller 7. Between the roller 7 and the pivot-bolt 3 is journaled a roller 8 upon the bolt 9, and between said rollers is an opening 10 for the passage of the line 11. The bolt 9 is made removable, so that the buckle or snap on the line may be readily passed through the frame 1, when the roller 8 is replaced in the frame and the line is confined between its periphery and that of the roller 7. As the line draws through the frame it travels in contact with said rollers, causing them to revolve and relieve the line of any rubbing wear. The movement of the sliding plate 5 prevents any undue crowding or cramping of the line, while the space between the rollers through which the line passes is never of sufficient width to allow the line to become twisted.

Upon a double set of harness to allow of a freer play of the cross-lines a frame 12 is employed, having an opening 13 for the passage of a strap 14, which is looped therethrough and through the ring 15 on the inner hame. Within the frame 12 is a slide 16, similar to slide 5 in frame 1 and mounted in the same manner. Journaled in the slide 16 is a roller 17, and journaled between the outer ends of the frame 12 is a roller 18 upon the bolt 19, which passes therethrough and through the ends of the frame 12. The bolt 19 is made removable, so as to allow the roller 18 to be taken out of frame 12 for the purpose of passing the snap or buckle upon the line therethrough, when the roller 18 is restored and the cross-line 20 is confined between the rollers 17 and 18, as shown in Fig. 3. This arrangement of suspending the frame 12 by means of a strap looped through the ring on the inner hame allows the cross-lines to be run more freely to the bit-ring of the opposite horses and more perfectly spreads said lines, while the rollers in said frame allow the line to pass freely therethrough and prevent it from twisting.

Ordinarily when used upon a single harness the hames will be equipped upon the inside and outside with the frames 1; but to provide for converting the single harness into a double harness said frames may be provided with the depending portion 21 at the corner, as shown in Fig. 5, through which is formed an opening 22, adapted to receive a strap 23, that may be passed through the opening 13 in the frame 12, whereby said frame 12 may be attached to the frame 1 in a manner shown in said view and serve to spread the cross-line, as before described.

Having thus fully set forth my invention, what I claim as new, and desire to secure by Letters Patent, is—

1. In a hames attachment, the combination with the hames, of a frame attached to the hames to swing freely, a slide in said frame carrying a roller, a roller journaled in the frame opposed to the roller of the slide, the space between the peripheries of said rollers forming a guideway for the line.

2. In a hames attachment, the combination with the hames, of a frame hinged thereto, a slide in said frame, a roller journaled in said slide, a second roller journaled in the frame opposed to the roller in the slide, said second roller being mounted upon a removable journal.

In testimony whereof I sign this specification in the presence of two witnesses.

ISAAC FRANK.

Witnesses:
WM. G. BORGERT,
J. C. BORGERT.